United States Patent [19]
Wright et al.

[11] Patent Number: 5,960,620
[45] Date of Patent: Oct. 5, 1999

[54] RAKE ARM ASSEMBLY

[75] Inventors: Charles Michael Wright, Ogden; Jeffrey Lee Mohr, St. Joseph, both of Ill.

[73] Assignee: Ogden Metalworks, Inc., Ogden, Ill.

[21] Appl. No.: 09/021,907

[22] Filed: Feb. 11, 1998

[51] Int. Cl.[6] .................................................. A01D 78/14
[52] U.S. Cl. .............................. 56/377; 56/15.9; 56/367
[58] Field of Search ............................. 56/377, 367, 372, 56/380, 389, 385, 365, 366, 15.9, 16.1

[56] References Cited

U.S. PATENT DOCUMENTS

| | | | |
|---|---|---|---|
| 2,499,867 | 3/1950 | Jones | 56/121.4 |
| 2,689,446 | 9/1954 | Sorrels | 56/377 |
| 2,710,519 | 6/1955 | Winter | 56/377 |
| 3,406,509 | 10/1968 | Wood | 56/377 |
| 3,706,191 | 12/1972 | Barbot | 56/377 |
| 4,920,735 | 5/1990 | Bailey et al. | 56/14.9 |
| 4,974,407 | 12/1990 | Rowe et al. | 56/377 |
| 5,031,705 | 7/1991 | Clemens | 172/6 |
| 5,127,216 | 7/1992 | Kelderman | 56/15.9 |
| 5,231,829 | 8/1993 | Tonutti | 56/377 |
| 5,263,306 | 11/1993 | Tonutti | 56/377 |
| 5,598,691 | 2/1997 | Peeters | 56/377 |

OTHER PUBLICATIONS

"Harvestman" the new Enrossi "V" rake, Enoagricola Rossi s.r.l, brochure, (No date).
H & S Bi–Fold Wheel Rake, H & S Manufacturing Co. Inc., brochure, (No date).

*Primary Examiner*—Robert E. Pezzuto
*Attorney, Agent, or Firm*—Grace J. Fishel

[57] ABSTRACT

A rake arm assembly for supporting a finger wheel on a side delivery rake such as a V-rake. The rake arm assembly has a shaft journaled under a support frame for the finger wheels. One end of the shaft is attached to a rake arm and the other end to a crank arm. A torsion spring on the shaft applies a torque to the rake arm reducing the weight of the finger wheel on the ground over a wide vertical range so that the finger wheel stays in contact with the ground and rides over mounds without bending the fingers.

10 Claims, 2 Drawing Sheets

RAKE ARM ASSEMBLY

BACKGROUND OF THE INVENTION

1. Field of the Invention

The present invention relates to a rake arm assembly with torsion spring support for a finger wheel, constituting an improvement over existing rake arm assemblies.

2. Brief Description of the Prior Art

A finger wheel rake employs a plurality of rotating tined wheels supported on a frame which is towed sideways across a field of cut forage to form windrows. As the frame is moved forward, the finger wheels are skidded across the ground and caused to rotate. The industry-standard finger wheel weighs about 54 pounds including the finger wheel spindle and hub and makes three-finger contact with the ground. While it is important that the rake apply some ground pressure for effective raking, it is also important that some of the weight be taken off the finger wheel. Too much weight on the finger wheel will cause the fingers to bend as the wheel is dragged into a mound such as a gopher hole, rock or the like. When the fingers are bent more than an inch or two out of vertical, raking action is compromised and the finger wheel must be replaced or repaired.

The industry standard rake arm assembly consists of a rake arm pivoted from a support frame. A finger wheel is mounted on the end of the rake arm at an angle to the frame. An upstanding lever is welded to the rake arm adjacent the finger wheel spindle and a pipe mounted on the frame. An extension spring is strung between the lever and the pipe with a chain passing through its core to prevent over extension. The chain also provides a means for raising the finger wheels for transport when the pipe is reciprocated on the frame.

In a downward direction, the rake arm assembly allows the finger wheels to follow the contours of the ground, the extension spring support, however, maxing out at about six inches below the starting position, at which point the finger wheels apply little or no pressure on the ground. In an upward direction, the extension spring provides no support and the full weight of the finger wheel is on three fingers. Hence, over a range of about 6 inches, the ground pressure applied by the finger wheels varies all the way from 0 to 54 pounds.

With a typical rake arm assembly, after the finger wheels are raised, the operator must get off his tractor and set a pin in the pipe to secure the unit in raised position, the reverse operation being required when he wants to lower the finger wheels. Most farmers do not like to get off their tractors as time is money. In addition, not infrequently the chain links tangle as the finger wheels are raised. This causes the finger wheels to be held in partially raised position when they are lowered, requiring the operator to dismount and straighten out the tangle before starting raking.

BRIEF SUMMARY OF THE INVENTION

In view of the above, it is an object of the present invention to supply a rake arm assembly for mounting a finger wheel, wherein the rake arm assembly provides more consistent support over a wider range. It is another object to supply a rake arm assembly that permits a finger wheel to stay in contact with the ground and ride over mounds without bending the fingers. Other objects and features of the invention will be in part apparent and in part pointed out hereinafter.

In accordance with the invention, a rake arm assembly has a shaft journaled to a support frame upon which a finger wheel is rotatably mounted. The shaft has first and second ends, with the first end attached to a rake arm and the second end attached to a crank arm.

The rake arm is angled away from the frame and has a free end adapted for mounting a finger wheel. A torsion spring is positioned on the shaft between the crank arm and the frame. The spring has first and second ends, with the first end attached to the support frame and the second end attached to the crank arm. The torsion spring is wound such that it applies a torque to the rake arm reducing the weight of the finger wheel on the ground, consistently over a wide vertical range.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings corresponding reference characters refer to corresponding parts throughout the several views of the drawings in which one of various possible embodiments of the invention is illustrated.

DETAILED DESCRIPTION OF THE INVENTION

Figure 1:
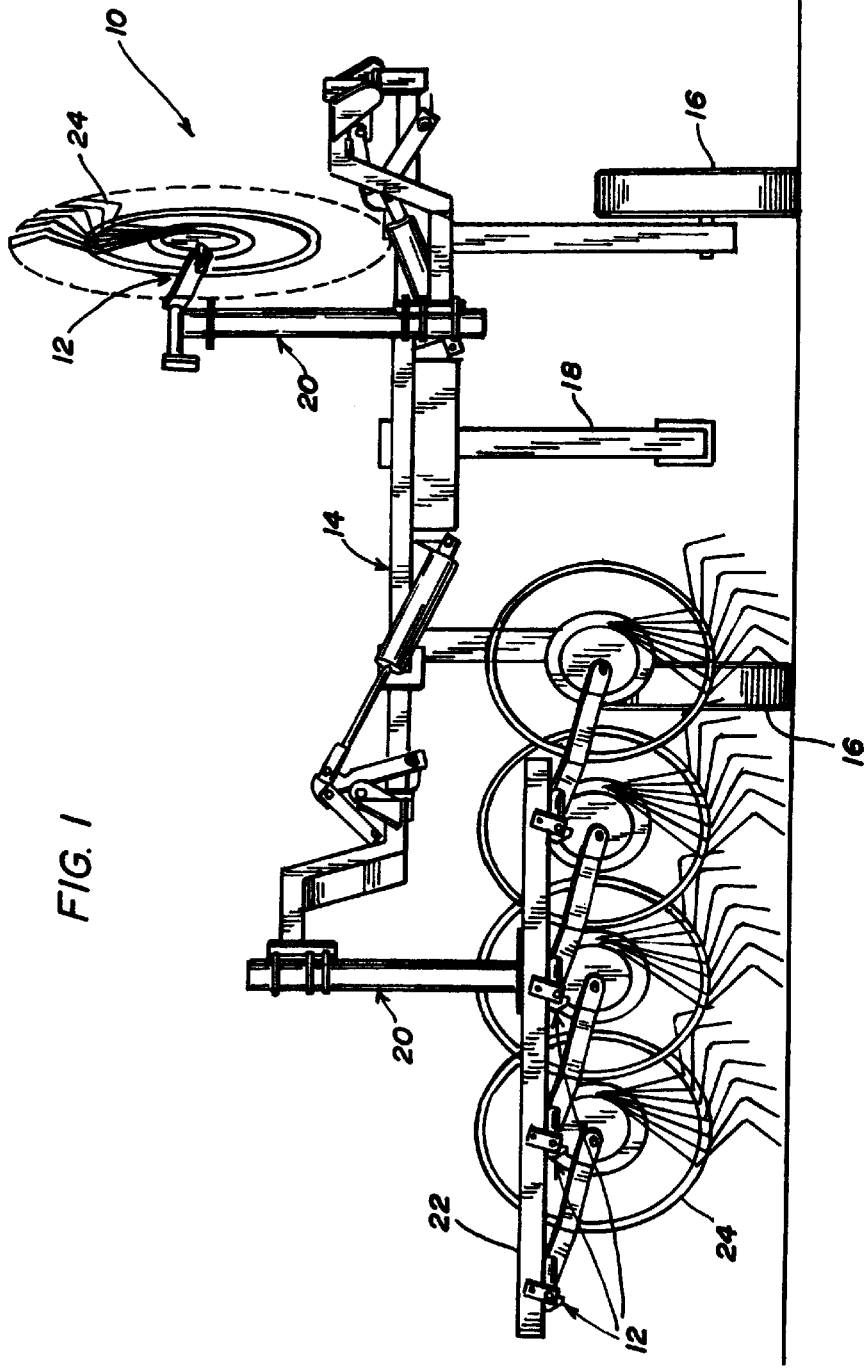
FIG. 1 is a rear elevational view of a folding finger wheel V-rake with a plurality of rake arm assemblies in accordance with the present invention installed on right and left movable heads.

Referring to the drawings more particularly by reference character, reference numeral 10 refers to a folding finger wheel V-rake with a plurality of rake arm assemblies 12 in accordance with the present invention. While rake arm assembly 12 is illustrated in use with a V-rake, it will be understood that it can be used with a side delivery rake consisting of a single frame with a plurality of finger wheels, including a side delivery rake with three-point attachment.

In the form illustrated in FIG. 1, rake 10 has a carrier 14 mounted on pneumatic tires 16 and adapted to be towed by a tractor by means of a tongue 18. A pair of movable heads 20 are mounted on the right and left hand side of carrier 14. On each moveable head 20 there is a support frame 22 that carries a plurality of finger wheels 24 mounted on rake arm assemblies 12.

Figure 2:
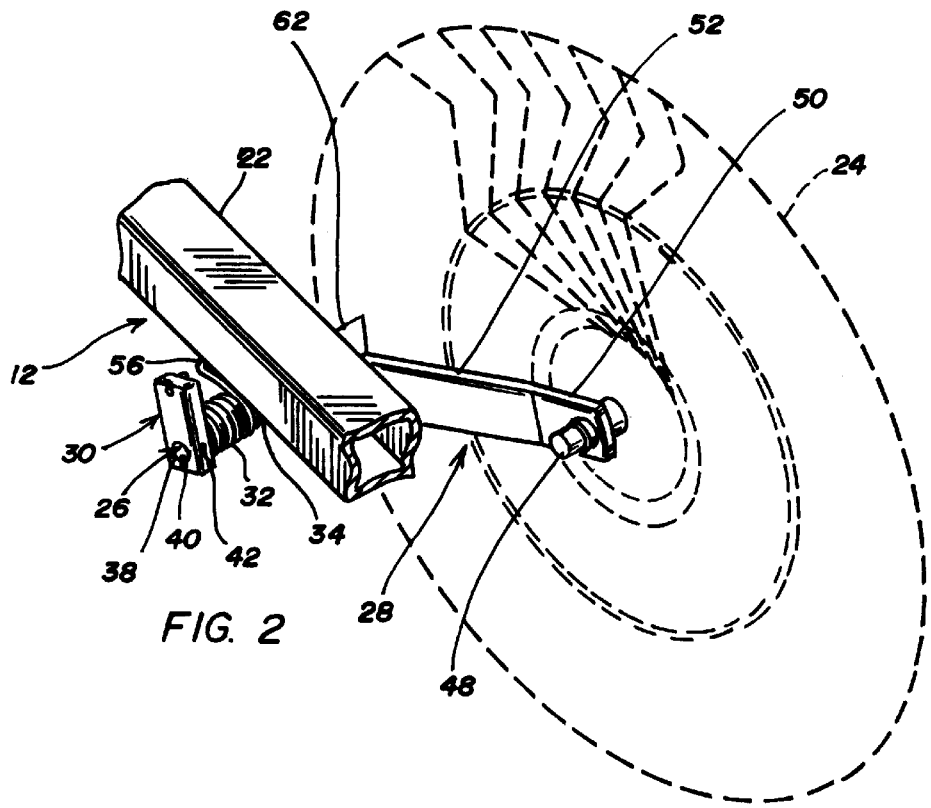
FIG. 2 is a rear perspective view of the rake arm assembly with the finger wheel spindle and hub shown in full lines and the finger wheel in broken lines.
Figure 3:
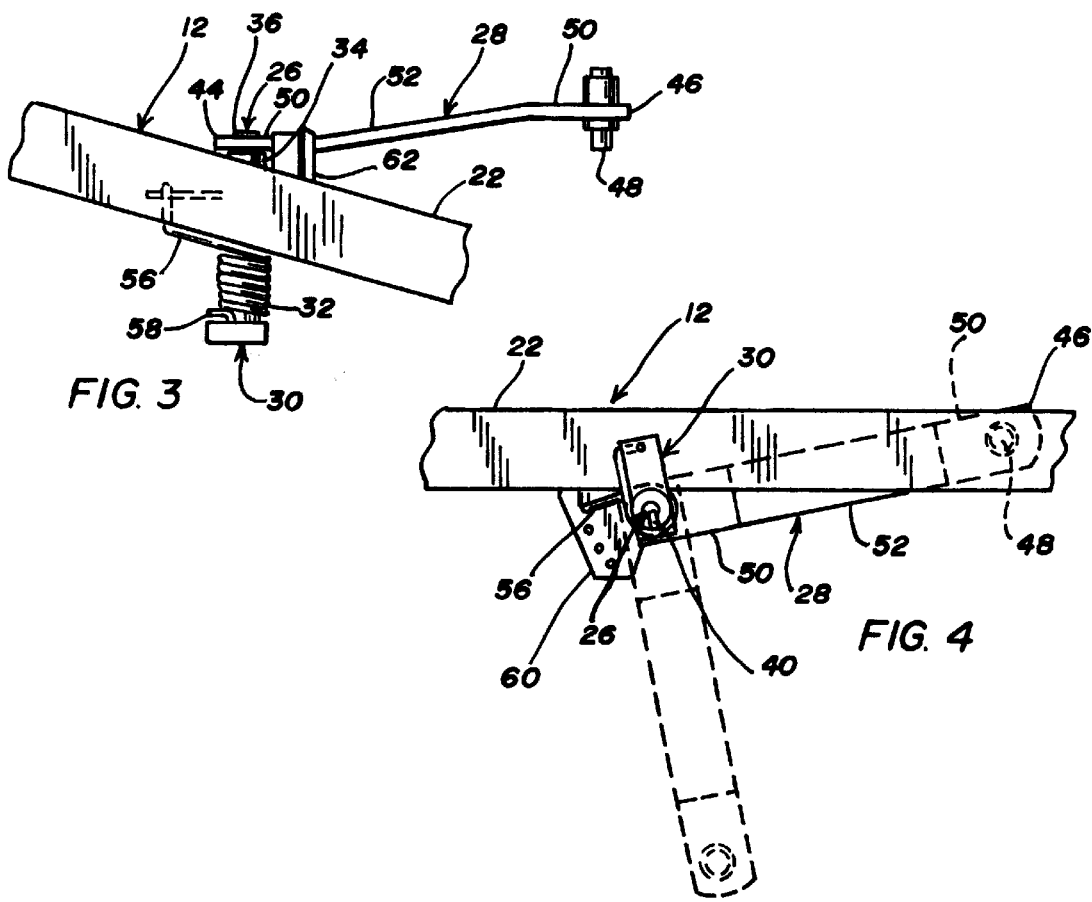
FIG. 3 is a top view of the rake arm assembly.
Figure 4:
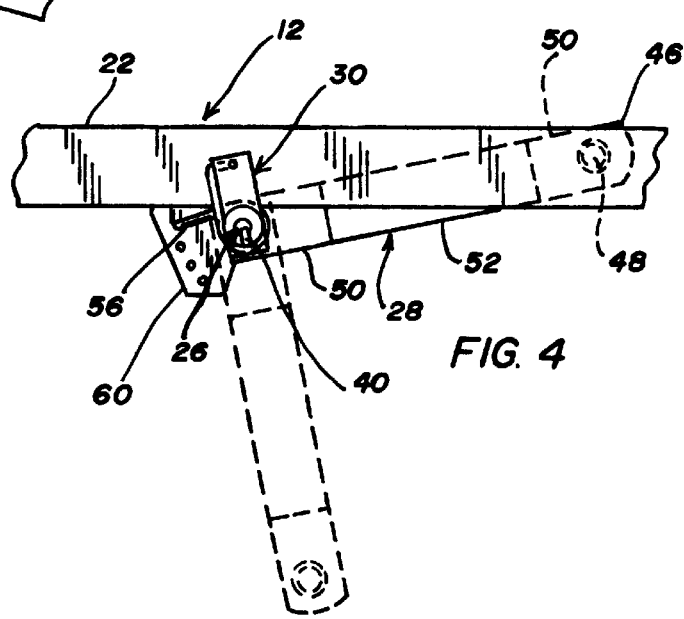
FIG. 4 is a rear side view of the rake arm assembly.

Turning now to FIGS. 2–4, rake arm assembly 12 in major part includes a shaft 26 journaled to support frame 22, a rake arm 28 upon which is mounted finger wheel 24, a crank arm 30 and a torsion spring 32. As shown in the drawings, shaft 26 is journaled in a spindle tube 34 welded to the underside of support frame 22. Tube 34 is set at an angle to a long axis of support frame 22, sloped in the direction of travel, the industry standard being about 10 degrees from perpendicular. A bushing, preferably Teflon coated and resistant to deformation on standing over the winter, may be provided in tube 34.

Shaft 26 has first and second ends 36, 38, respectively, first end 36 making right angled attachment to rake arm 28 and second end 38 to crank arm 30. First end 36 of shaft 26 may be welded to rake arm 28 since it need not be disassembled in use, while second end 38, as best seen in FIGS.

2 and 4, is preferably attached to one end of crank arm 30 with a key 40 held in place with a set screw 42.

Rake arm 28 has first and second ends 44, 46, respectively, first end 44, as aforementioned, is attached to first end 36 of shaft 26. Second end 46 is adapted for mounting a wheel axle 48 of finger wheel 24 parallel with shaft 26, one such possible arrangement being shown in the drawings. Rake arm 28, when viewed from above as in FIG. 3, has a relaxed Z-shape with legs 50 and spine 52. Legs 50 make the same but opposite angle as tube 34 with respect to the long axis of support frame 22 and spine 52 angles away so that finger wheels run parallel and overlap with each other but do not hit.

Torsion spring 32 is provided on shaft 26 between crank arm 30 and support frame 22. Torsion spring 32 is a closed coil helical spring with first and second ends 56, 58, respectively, designed to provide a torque when load is exerted on the ends. As shown in FIG. 2, torsion spring 32 is wound clockwise for use on support frame 22 mounted on the left side of carrier 14. It will be readily appreciated that rake arm assembly 12 on the right side of carrier 14 is of opposite hand and torsion springs are, accordingly wound counterclockwise.

First end 56 of torsion spring 32 is attached to support frame 22 and second end 58 is attached to crank arm 30 distal its attachment to shaft 26. In simple form, first and second ends 56, 58 are received in holes provided in the frame and crank arm for that purpose. First end 56 resists the twisting forces applied by the spring to rake arm 28. To adjust the applied load, an adjustment bracket 60 is attached to support frame 22 and spindle tube 34. As best seen in FIG. 4, adjustment bracket 60 has a plurality of holes, the highest hole giving the least support to rake arm 28, while the lowest hole provides the most support, as might be suitable for raking something light and fluffy, like wheat straw. Adjustment of first end 56 of torsion spring 32 in bracket 60 is made by releasing set screw 42 and removing key 40, freeing the spring from crank arm 30. First end 56 of torsion spring 32 can then be removed from bracket 60 and reinserted in a selected hole, followed by insertion of second end 58 in crank arm 30 and reattachment of the crank arm on shaft 26.

Other ways of adjusting the load on torsion spring 32 will readily occur to those skilled in the art. For example, an elongated slot could be substituted for the holes shown in bracket 60 with an eye bolt provided for securing end 56 in selected position. This arrangement eliminates the need for releasing set screw 42 and removing key 40, eliminating the risk that these small parts might be lost on the ground.

When rake arm assembly 12 is used on a carrier 14 such as shown in FIG. 1, a stop 62 is provided on support frame 22 above each rake arm 28. In use, stop 62 prevents upward rotation of rake arm 28 beyond a predetermined amount. It also prevents the rake arm from unwinding torsion spring 32 when support frame 22 is rotated upside down for transport.

The amount of support given to rake arm 28 depends upon the length of the rake arm and the nature of torsion spring 32. When rake arm 28 is 17 inches long from the center of shaft 26 to the center of wheel axle 48, in the best mode presently known to practice the invention, torsion spring 32 has six active coils with an inside diameter of 2.25 inches and an outside diameter of 2.90 inches. The diameter of the wire is 0.350 inches. It will be understood that the above particulars are given by way of example, not limitation, as other satisfactory torsion springs can be designed with different numbers of active coils and dimensions.

When torsion spring 32 is as described above, rake arm assembly 12 can be arranged so that when first end 56 of torsion spring 32 is in uppermost hole of bracket 60, rake arm 28 can move 8 inches above neutral position and 9 inches down, making a total of 17 inches of supported movement. In neutral position, when frame is horizontal and finger wheels 24 are on level ground, rake arm 28 is about 6 inches below stop 62. In the extreme up position, when the rake arm is against the stop, finger wheel applies 31 pounds of pressure to the ground and in extreme down position, 9 pounds, with rest of the weight being counterbalanced by torsion spring 32. At both extremes, torsion spring 32 is functional, taking some of the weight off the finger wheel at the upper extreme, helping to keep the fingers from being bent, and leaving enough weight on the finger wheel at the lower extreme to provide some raking action. In intermediate positions, finger wheel applies 27 pounds of pressure at 4 inches below stop 62 and 20 pounds at 8 inches below. As will be apparent, when first end 56 of torsion spring 32 is in a lower hole of bracket 60, the range of motion and amount of torque applied to rake arm 28 will be different, the range of motion being less and the torque being greater.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A rake arm assembly for mounting a finger wheel on a support frame at an angle to a direction of travel, said rake arm assembly comprising a shaft journaled to the frame, said shaft having first and second ends, said first end attached to a rake arm and said second end attached to a crank arm, said frame positioned between said rake arm and said crank arm;

said rake arm angled away from the frame and having a free end adapted for mounting the finger wheel; and, a torsion coil spring surrounding the shaft between the crank arm and the frame, said torsion spring having first and second ends, said first end attached to the frame and said second end attached to the crank arm, said torsion spring wound such that it applies a torque to the rake arm reducing the weight of the finger wheel on the ground over a wide vertical range whereby the finger wheel stays in contact with the ground and rides over mounds without bending the fingers.

2. The rake arm assembly of claim 1 further comprising a stop on the frame above the rake arm for preventing the rake arm from unwinding the torsion spring.

3. The rake arm assembly of claim 2 wherein the crank arm is attached to the shaft with a key.

4. The rake arm assembly of claim 3 further comprising a bracket attached to the frame for adjusting the load on the torsion spring by changing the position of the first end of the torsion spring with respect to the second end.

5. A rake arm assembly for mounting a finger wheel on a support frame, said rake arm assembly comprising a shaft journaled in a spindle tube attached under the frame, said spindle tube set at an angle to a long axis of the frame and sloped in the direction of travel, said shaft having first and second ends, said first end attached to a rake arm and said second end attached to a crank arm, said frame positioned between said rake arm and said crank arm;

said rake arm angled away from the frame and having a free end adapted for mounting the finger wheel so that the shaft and a wheel axle of the finger wheel are parallel; and, a torsion coil spring surrounding the shaft between the crank arm and the frame, said torsion spring having first and second ends, said first end attached to the frame and said second end attached to the crank arm, said torsion spring wound such that it applies a torque to the rake arm reducing the weight of the finger wheel on the ground over a wide vertical range whereby the finger wheel stays in contact with the ground and rides over mounds without bending the fingers.

6. The rake arm assembly of claim 5 further comprising a stop on the frame above the rake arm for preventing the rake arm from unwinding the torsion spring.

7. The rake arm assembly of claim 5 wherein the crank arm is attached to the shaft with a key.

8. The rake arm assembly of claim 7 further comprising a bracket attached to the frame for adjusting the load on the torsion spring by changing the position of the first end of the torsion spring with respect to the second end.

9. The rake arm assembly of claim 8 wherein the torsion spring is wound clockwise and the rake arm assembly is adapted for use on a left head mounted on a V-rake carrier.

10. The rake arm assembly of claim 8 wherein the torsion spring is wound counterclockwise and the rake arm assembly is adapted for use on a right head mounted on a V-rake carrier.

* * * * *